United States Patent
Faverio (10) Patent No.: US 10,919,187 B2
(45) Date of Patent: Feb. 16, 2021

(54) METHOD FOR MANUFACTURING COSMETIC PRODUCTS, PREFERABLY LIPSTICKS, COCOA BUTTER LIPCARE STICKS OR LIP GLOSSES, AND RELATED MANUFACTURING MACHINE

(71) Applicant: PATENT LAB SA, Chiasso (CH)

(72) Inventor: Sergio Faverio, Chiasso (CH)

(73) Assignee: PATENT LAB SA, Chiasso (CH)

( * ) Notice: Subject to any disclaimer, the term of this patent is extended or adjusted under 35 U.S.C. 154(b) by 207 days.

(21) Appl. No.: 15/124,088

(22) PCT Filed: Mar. 18, 2015

(86) PCT No.: PCT/IB2015/051986
§ 371 (c)(1),
(2) Date: Sep. 7, 2016

(87) PCT Pub. No.: WO2015/140733
PCT Pub. Date: Sep. 24, 2015

(65) Prior Publication Data
US 2017/0015022 A1    Jan. 19, 2017

(30) Foreign Application Priority Data

Mar. 18, 2014 (IT) .......................... RM2014A000139

(51) Int. Cl.
*B29C 39/36* (2006.01)
*A45D 40/16* (2006.01)
(Continued)

(52) U.S. Cl.
CPC .............. *B29C 39/36* (2013.01); *A45D 40/16* (2013.01); *B29C 35/16* (2013.01); *B29L 2031/718* (2013.01)

(58) Field of Classification Search
CPC ......... B29C 39/36; B29C 35/16; A45D 40/16; B29L 2031/718
See application file for complete search history.

(56) References Cited

U.S. PATENT DOCUMENTS 5,066,216 A * 11/1991 Kowtko ................. A45D 40/16
137/862
5,316,712 A * 5/1994 Ono ....................... A45D 40/16
264/102
(Continued)

FOREIGN PATENT DOCUMENTS

EP      0 966 898 A2    12/1999
WO   WO-2014113654 A1 *  7/2014 ............. A45D 40/16

OTHER PUBLICATIONS

International Search Report, dated Jun. 8, 2015, from corresponding PCT Application.

*Primary Examiner* — Kelly M Gambetta
(74) *Attorney, Agent, or Firm* — Nixon & Vanderhye (57) ABSTRACT

Method for producing cosmetic products, preferably lipsticks, lip salves or lip glosses, the method including the steps of:
  providing a containment capsule or pod (7) containing an amount of preparation (1) for cosmetic product lower than 20 g; the pod extending along a central axis to a height H;
  introducing the pod or capsule (7) into a pouring chamber or seat (6) to at least ⅔ of H;
  heating the pod or capsule (7) up to a predetermined temperature adapted to cause an at least partial phase change of the preparation (1) for cosmetic product;
  pouring the preparation (1) for cosmetic product into a sleeve (8) provided with an inner cavity (9) reproducing the negative shape of the poured cosmetic product to be obtained;

(Continued)

cooling the cosmetic product poured in the sleeve (8);
extracting the poured cosmetic product from the sleeve (8).

10 Claims, 6 Drawing Sheets

(51) Int. Cl.
    *B29C 35/16*     (2006.01)
    *B29L 31/00*     (2006.01)

(56) References Cited

U.S. PATENT DOCUMENTS

| | | | | |
|---|---|---|---|---|
| 2001/0041169 | A1* | 11/2001 | Allan | A45D 40/16 424/65 |
| 2005/0150903 | A1* | 7/2005 | Py | B65D 47/2075 222/83.5 |
| 2016/0143416 | A1* | 5/2016 | Dourlens | B65B 63/08 53/440 |
| 2017/0035183 | A1* | 2/2017 | Faverio | A45D 40/16 |

* cited by examiner

METHOD FOR MANUFACTURING COSMETIC PRODUCTS, PREFERABLY LIPSTICKS, COCOA BUTTER LIPCARE STICKS OR LIP GLOSSES, AND RELATED MANUFACTURING MACHINE

TECHNICAL FIELD

The present invention relates to the cosmetic field and, in detail, concerns a process and a machine for producing capsules of cosmetic products. In detail, such cosmetic products are preferably lipsticks or lip glosses or lip salves like sticks.

KNOWN ART

Figure 1:
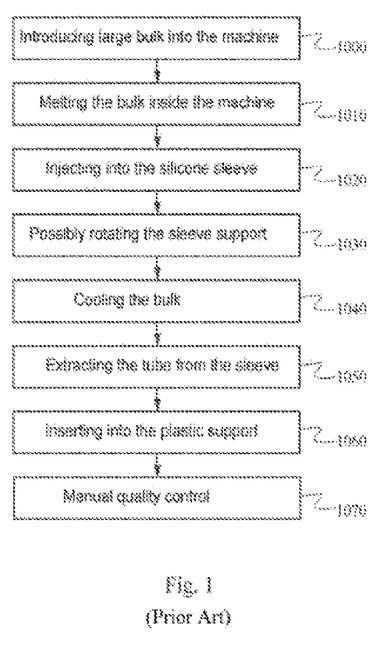
FIG. 1 is a block diagram of a producing process of known lipsticks.

Referring particularly to cosmetic products, such as lipsticks or lip glosses or even lip salves like sticks, it is known that they are currently produced according to a method briefly described hereinafter, particularly referring to FIG. 1. First of all a bulk, or base volume, of lipstick preparation produced according to predetermined technical specification based on a color set, is introduced (block 1000) into an opening or inlet of a lipstick preparing machine which primarily melts the afore said bulk (block 1010).

The bulk could be molten in a specific melter fluidically connected to the machine.

Subsequently, the molten bulk is injected through nozzle-like injecting means into a plastic sleeve or coating (block 1020), preferably made of silicone, having the final shape of the lipstick. The final shape of the lipstick tube is obtained by injecting the molten bulk into the plastic sleeve or coating. In detail, the inner surface of the plastic sleeve or coating is designed so as not to adhere to the bulk material, thereby allowing the bulk to be subsequently separated from the sleeve or coating without damaging the outer surface of the lipstick tube, which is required for aesthetic reasons to be free of surface damages.

In detail, the known machine is provided with a plurality of sleeves or coatings on a circular rotating surface within respective housings angularly spaced along a circumference; a new coating is placed step by step in front of the nozzle-like injecting means by the rotation (block 1030) of this circular surface.

The bulk injected within the sleeve or coating must then be cooled (block 1040); conversely, it would not be able to maintain the shape provided by the sleeve itself, and the process leading to create the commercially sold "lipstick" could not carry on.

At this point, mechanical gripping means gently grasp the rear part of the lipstick tube (block 1050) by extracting the tube itself from the sleeve or coating and introduce it into the final plastic support, the latter typically comprising a first portion, or cap, and a second portion or main body provided with a roto-translating support controlled by a rotating ring having, in turn, a plurality of helically arranged grooves in which respective pins of the roto-translating support are engaged; the lipstick tube is introduced on this support by mechanically countering (block 1060).

At the end of the latter step, the lipstick tube is subjected to a visual quality control (block 1070), that is manually made by human; if that quality control is positive, the lipstick can be led to the destination of the lipstick to the commercial market.

However the producing technique hitherto described is characterized by some disadvantages. In particular the Applicant noticed that, on the one hand, the cost of the preferably plastic support is part of the cost of the lipstick; in particular, the lower the cost of the product itself, i.e. the actual lipstick tube, the greater the percentage cost fraction of the support, preferably made of plastic. Often, in fact, medium or even medium-high quality lipsticks are substantially inaccessible or not purchased by the average public because of their retail cost substantially due to primary and secondary packaging.

Furthermore, the Applicant noticed that the disposal of the lipstick support, preferably made of plastic, at the end of the use is not environmentally friendly: in fact, it is typically made of materials, or coated with paints or other coatings, which are not biodegradable.

Furthermore, the Applicant has found that there is an excessive waste of products, such as lipsticks and lip glosses, which are not used but in any case produced with their packaging, with respect to those actually required by the market.

Nevertheless, the Applicant has observed that the quality control performed by the human being is slow and expensive, as well as not always reliable. However, such quality control has a substantial impact on productive costs of the lipstick.

Finally, the current producing methods and machines are not able to substantially reduce the working times of the machine itself.

Therefore, the Applicant found the need to solve the problems of the prior art by providing a process for producing cosmetic products, shaped as sticks or tubes, which is able to drastically reduce the problems and the disposal of plastic supports and to significantly reduce the packaging cost fraction for the end user in relation to the total cost of the product.

SUMMARY OF THE INVENTION

Therefore, a first aspect of the present invention concerns a method for producing cosmetic products, preferably lipsticks, lip salves or lip glosses, said method comprising the steps of providing a containment capsule or pod containing an amount of preparation (1) for cosmetic product lower than 20 g; said capsule or pod extending along a central axis to a height H;

introducing said capsule or pod into a pouring chamber or seat;

heating said container up to a predetermined temperature adapted to cause an at least partial phase change of the preparation for cosmetic product;

pouring the preparation for cosmetic product into a sleeve provided with an inner cavity reproducing the negative shape of the poured cosmetic product to be obtained;

cooling said cosmetic product poured in said sleeve;

extracting the poured cosmetic product from said sleeve.

The method according to the present invention allows a finished cosmetic product to beobtained starting from a preparation of finished contained in a containment capsule or pod, by substantially changing only the shape thereof.

In this way, the customer or end user will not be forced to buy a finished product constituted by the cosmetic product itself and the packaging thereof intended as an appliance (base provided with a mechanism for the movement of the tube or stick and the cover).

The customer or end user, who already owns a single appliance, can only buy the pods or capsules and refill it. Once purchased, this appliance can be refilled several times from capsules or pods that differ depending on the basic preparation for cosmetic product or color.

In this way it is possible to significantly cut the cost fraction of the packaging, i.e. of the appliance, with respect to the cost of the finished product and remove, or anyway significantly reduce, the environmental impact related to the disposal of the packaging itself.

In the context of the present invention the following definitions are valid:
- capsule or pod means a little container provided with a cup-shaped body adapted to contain an amount of a preparation for cosmetic product lower than 20 g, preferably lower than 10 g. The body comprising a side wall and a bottom and extending around a vertical axis X-X. At least one cover, adapted to close the body, can be provided. Generally, the body has a substantially cylindrical or frusto-conical shape;
- tube or stick means a substantially cylindrical shape, at one end the cylindrical shape tapers to form a vertex, near the vertex one or two surfaces can be present as oblique or cut on one side;
- poured cosmetic product means the cosmetic product downstream of the pouring step until it is extracted from the machine;
- appliance for lipstick or cosmetic product shaped as a stick or tube, or simply appliance, means the packaging of the cosmetic product shaped as a stick or tube. Generally, it is made up of a base holding and supporting the tube or stick at one end thereof, a generally tubular cylindrical cover forming, when coupled with the base, an outer casing for the cosmetic product shaped as a stick or tube and a mechanism for the movement of the tube or stick, usually contained in the base and being able to extract and retract the tube or stick from a tubular guide, usually called liner, extending from the base.

The present invention, in the afore said aspect, may have at least one of the favorite features described hereinbelow.

Advantageously, the amount of preparation for cosmetic product contained in the containment capsule or pod is such that, at the end of the method, a single product is obtained, i.e. a single lipstick, a single lip gloss or a single lip salve.

Conveniently, the cosmetic product comprises a mixture of oils, waxes and pellets of colored or pigmented and/or pearlizing material mixed with a base composition having homogeneous consistency; said base composition further comprising at least one of the following excipients: gloss modifiers, wetting agents or humectants, vitamins, fruit extracts, sunscreens, as well as conserving agents such as preservatives and/or antioxidants.

Preferably, the method further comprises the step of applying a pressure to the preparation of cosmetic product contained in the capsule or pod so as to aid the pouring thereof.

Advantageously, the pressure is mechanically applied through a pressure member.

Preferably, the capsule or pod is introduced into the pouring chamber or seat to at least ⅔ of its extent H, still more preferably to at least 90% of its extent H. Advantageously, the capsule or pod is completely introduced into the pouring chamber or seat.

Conveniently, the pod or capsule comprises at least one thermally conductive portion. Preferably, either the side wall or the bottom wall, or both are made of a thermally conductive material, such as aluminum.

Conveniently, the method further comprises the step of combining a mechanism for the movement of the tube or stick with the poured cosmetic product, preferably downstream of the cooling step.

Advantageously, the step of combining a mechanism for the movement of the tube with the poured cosmetic product, is carried out downstream of the cooling step.

Preferably, the cooling step cools the cosmetic product down to a temperature lower than 40° C.

Advantageously, the step of heating the cosmetic product comprises heating said capsule or pod up to a temperature of the cosmetic product at least higher than 60° C.

Preferably, since the inner cavity of the sleeve is shaped as a tube or stick, then the poured cosmetic product takes the shape of a tube or stick.

Preferably, the pod or capsule, hermetically sealed, is introduced into a pouring chamber or seat and the method comprises a piercing or perforating step to pierce or perforate said capsule or pod.

According to another aspect, the present invention concerns a machine for implementing the above described method, the machine comprising:
- a pouring chamber shaped so as to at least partially accommodate a capsule or pod comprising a preparation for cosmetic product;
- heating means to heat the preparation for cosmetic product contained inside the capsule or pod;
- at least one sleeve comprising a cavity reproducing the negative shape of the poured cosmetic product to be realized;
- an extracting device to extract the poured cosmetic product from said sleeve.

Advantageously, the machine comprises at least one cooling chamber.

Preferably, the machine comprises a pressure member able to apply a pressure onto the cosmetic product contained inside the capsule or pod.

Conveniently, the machine comprises a perforating element to perforate the capsule or pod.

Advantageously, the machine comprises a device for combining the poured cosmetic product with a base for the movement of the tube or stick.

DESCRIPTION OF THE ATTACHED FIGURES

In the present description, the Applicant illustrates a preferred, non-limiting embodiment of the invention, referring to the appended figures, wherein.

DETAILED DESCRIPTION OF THE INVENTION

Referring to FIGS. 2-6, the present invention describes a machine 10 and a method for producing cosmetic products, preferably lipsticks, lip salves or lip glosses. Therefore, by way of example and without restrictive intent, the present description will address to the description of a machine and a method in which the cosmetic product is a lipstick. It is understood that the machine and the process may be used for producing other cosmetic products without departing from the protection scope of the present invention.

In detail, the machine 10 comprises a pouring chamber or seat 6 shaped so as to at least partially accommodate a capsule 7 comprising a preparation 1 of cosmetic product.

The preparation 1 of cosmetic product comprises a mixture of oils, waxes and pellets of colored material (pigment) and/or pearlizing material mixed together so as to look like a base composition having homogeneous consistency. The base compound can be further characterized by gloss or texture modifiers, wetting agents or humectants, vitamins fruit extracts, sunscreens, as well as conserving agents, such as preservatives and/or antioxidants.

For example, the capsule 7 is made of aluminum and is provided with a cup-shaped body adapted to contain an amount of a preparation 1 for cosmetic product lower than 20 g, preferably lower than 10 g. The body comprises a side wall 7a and a bottom 7b and extends around a vertical axis X-X. At least one cover, adapted to close the top of the body, can be provided. Generally, as shown in FIG. 2, the body has a substantially cylindrical or frusto-conical shape.

Preferably, the capsule comprises at least one thermally conductive portion. Preferably, either the side wall 7a or the bottom wall 7b, or both are made of a thermally conductive material, such as aluminum.

Still referring to the embodiment shown in figures, it can be noted that the capsule or pod extends along a central axis to a length H.

Figure 2:
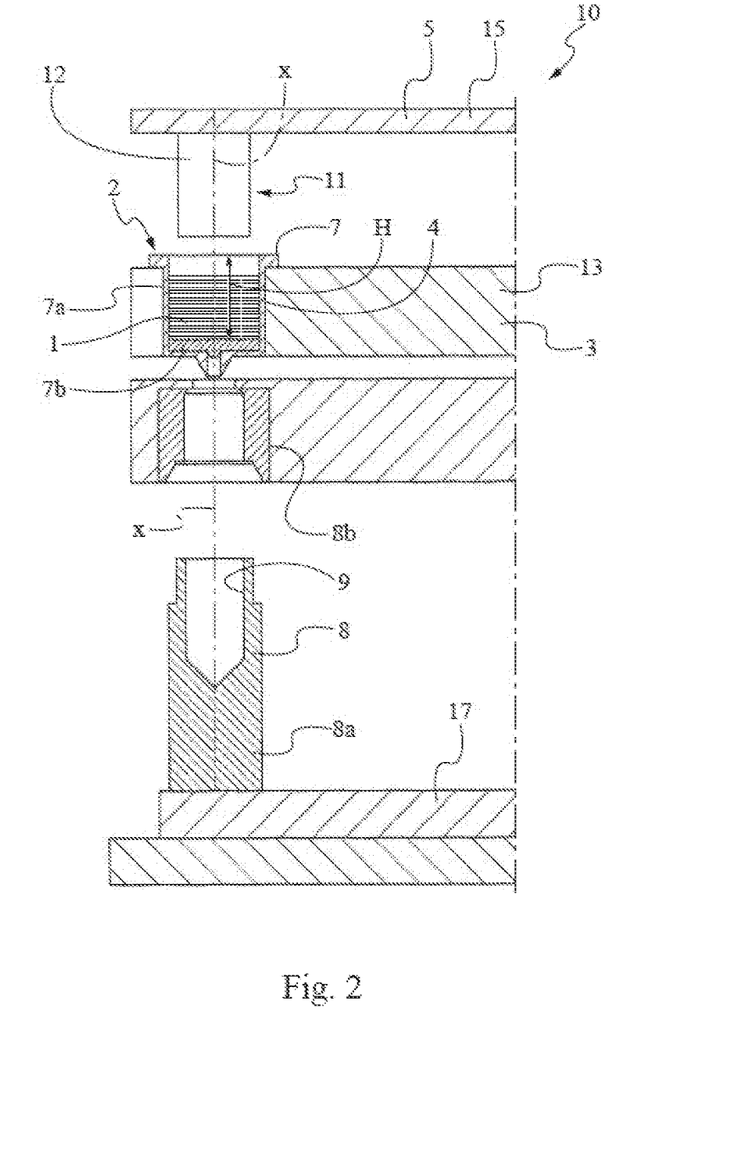
FIG. 2 is a schematic illustration of a machine for producing capsules of cosmetic products according to the present invention, during the step of introducing the capsule into the pouring seat.
Figure 3:
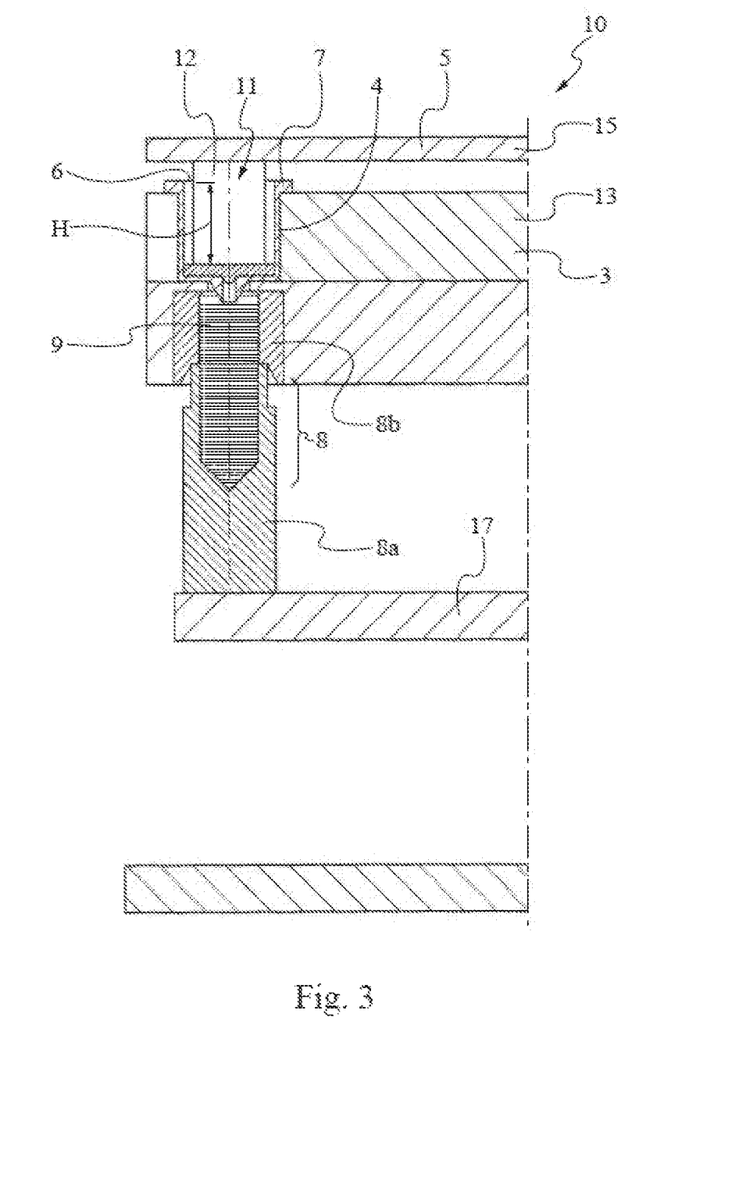
FIG. 3 is a schematic illustration of a second step of the machine according to the present invention in which a pressure member fully penetrated the capsule in order to aid the preparation for cosmetic product to be poured in the underneath sleeve.
Figure 4:
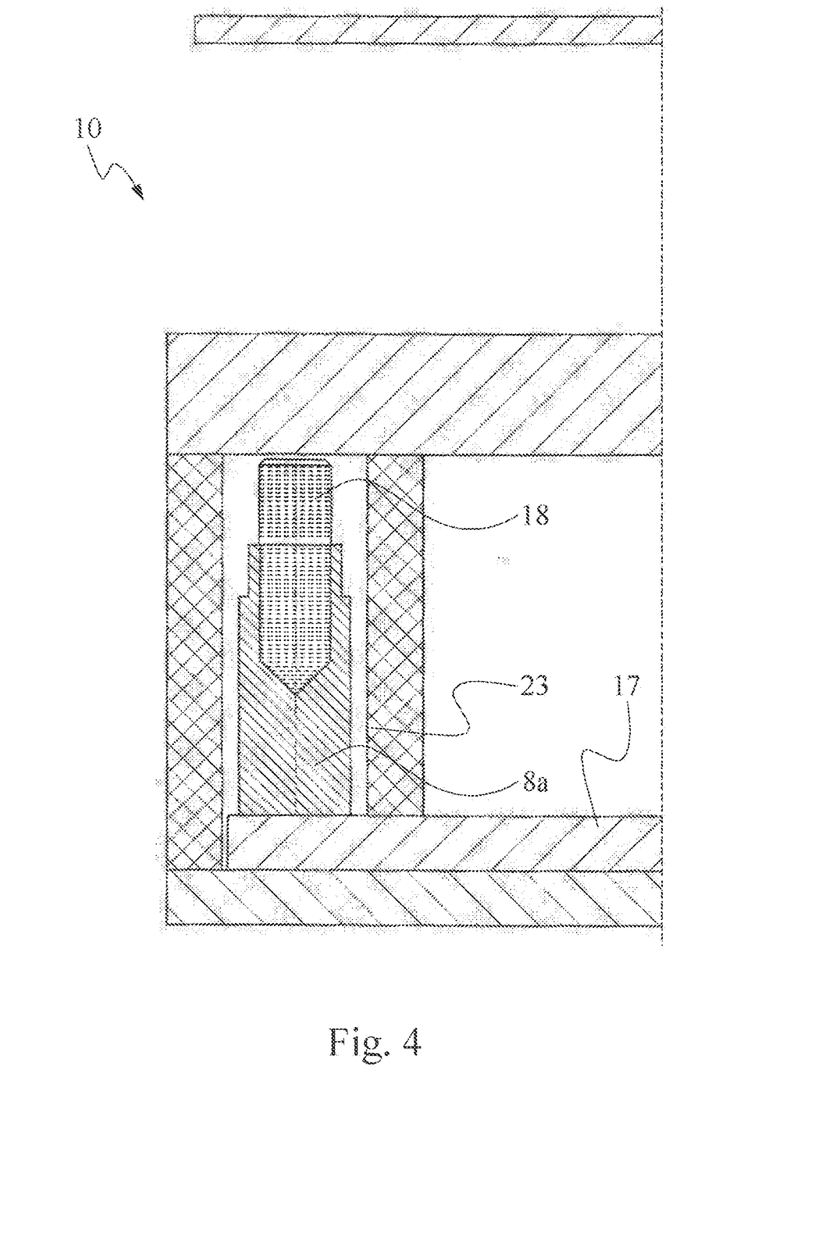
FIG. 4 is a schematic illustration of a third step of the machine according to the present invention in which the sleeve containing the preparation for poured cosmetic product is placed in a cooling chamber.

The machine 10, as shown in FIGS. 2-4, comprises a first element 3 provided with a cavity 4 adapted to at least partially accommodate the capsule 7 and a second element 5 cooperating with the first element 3 so as to define, when coupled with the latter, a pouring chamber 6.

In the embodiment shown in FIGS. 2-6, the first element 3 is formed in a movable lower portion 13 of the frame of the machine 10, whereas the second element 5 is formed in a fixed upper portion 15 of the frame of the machine 10.

The movable lower portion 13 moves between a working position, in which the second element 5 cooperates with the first element 3 in order to define, when coupled with the latter, a pouring chamber or seat 6 (shown in FIG. 3) and a second position, shown in FIG. 2, in which the second element 5 is spaced from the first element 3, thereby leaving the way clear to the accommodating cavity 4 for the capsule 7 (FIG. 2).

Alternatively, the first element 3 could be formed in a fixed portion of the frame of the machine 10 and, vice versa, the second element 5 in a movable portion of the machine 10.

Furthermore the machine 10 comprises first heating means, which advantageously are able to heat the capsule 7 and the preparation 1 for cosmetic product contained therein up to a predetermined temperature adapted to cause an at least partial phase change of the preparation 1 for cosmetic product and to aid the pouring thereof into an underneath sleeve 8.

Preferably, the first heating means are adapted to heat the preparation of cosmetic product up to a temperature higher than 60°, preferably a temperature of about 70° C., or anyway able to prevent the preparation 1 for cosmetic product from solidifying, even partially, because this may cause the homogeneity of the preparation to be damaged or the herein described machine to become blocked or clogged, either alternatively or in combination one with the other.

Optionally, the machine 10 can also be provided with stirring means, not shown in the figure, able to keep the preparation 1 for cosmetic product as moving inside the capsule 7 itself, so as to advantageously keep unchanged the homogeneity thereof.

The machine 10 further comprises a pressure member 11 able to apply a pressure on the preparation 1 for cosmetic product contained inside the capsule.

In the embodiment shown in FIGS. 2, 3, the pressure member 11 is shown as a piston 12 extending from the upper element 5 in a vertical direction.

The piston 12 is arranged so as to penetrate the capsule 7 when the pouring chamber 6 is closed, and to apply a mechanical pressure on the preparation 1 for cosmetic product in order to facilitate its outflow towards the underneath sleeve 8.

Therefore, the diameter of the piston 12 may be slightly smaller than that of the body of the capsule 7.

Alternatively, the pressure member 11 does not penetrate the capsule 7, but it can be shaped so as to cause the structural collapse of the capsule 7 so that the walls themselves, or a portion thereof, of the capsule 7 apply a pressure to the preparation 1 of cosmetic product in order to facilitate its outflow towards the underneath sleeve 8.

Furthermore, the machine 10 can be provided with a perforating element adapted to perforate the capsule 7 containing the preparation 1 of cosmetic product.

Preferably, the perforating element is shaped so as to perforate the capsule 7 at a bottom thereof.

As shown in FIGS. 2-6, the machine 10 is provided with a sleeve 8 in which the preparation 1 of cosmetic product is poured from the capsule 7 after being suitably heated.

The sleeve 8 comprises an inner cavity 9 reproducing the negative shape of the poured piece to be realized, i.e. the mould to make the tube or stick 18.

In the embodiment shown in FIGS. 2, 3, the sleeve 8 is made by combining two components, a lower portion 8a and an upper portion 8b. Alternatively, it can be made in one piece without departing from the protection scope of the present invention.

In the embodiment shown in FIGS. 2-6, the lower portion 8a is supported by an additional movable part 17 of the frame of the machine 10.

Furthermore, an extracting device is formed by the movable portion 17 of the frame of the machine 10.

In FIG. 4 a cooling chamber 23 is shown, the cooling chamber 23 is shaped and sized so as the sleeve 8, and in particular a lower portion 8a thereof with the poured tube or stick 18, is received inside it.

The cooling chamber 23 comprises cooling means which are advantageously able to cool the preparation 1 of cosmetic product, poured in the cavity 9 of the sleeve 8, down to a temperature allowing it to be combined with a movement mechanism and a base of the lipstick appliance 19, thereby allowing the tube or stick 18 to be subsequently extracted from the sleeve 8.

The cooling chamber 23 is spaced from the pouring chamber or seat 6, in the embodiment shown in figures the cooling chamber is angularly spaced from the pouring chamber or seat 6.

In this case after the pouring, the sleeve 8 with the tube 18 are carried by the lower portion 17 of the machine 10, for example through a rotary motion, from the pouring chamber or seat 6 to the cooling chamber 23.

Preferably, the cooling chamber 23 is a thermally insulated chamber.

Furthermore, the machine 10 can be provided with an assembly for combining the tube or stick 18 made by the cavity 9 of the sleeve 8 and cooled down to the proper temperature, with a mechanism for the movement of the tube and with an appliance base 19.

Figure 5:
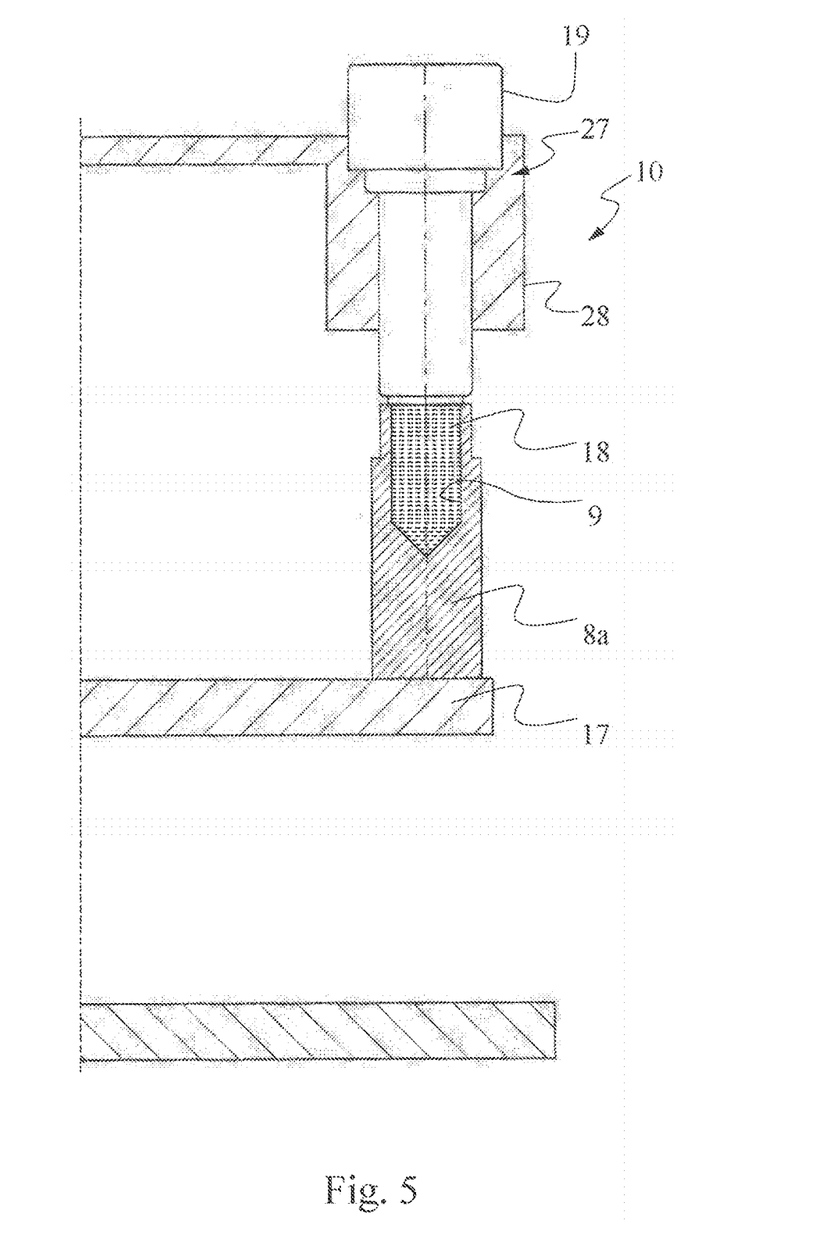
FIG. 5 is a schematic illustration of a fourth step of the machine according to the present invention in which the tube or stick obtained in the pouring step is mechanically coupled with a base of the lipstick appliance.

In FIG. 5 is shown an embodiment of an assembly 27 for combining the tube or stick 18 made by the cavity 9 of the sleeve 8 and cooled down to the proper temperature, with a mechanism for the movement of the tube and with an appliance base 19.

The assembly 27 looks like a fixed support 28 supporting the appliance base 19 comprising the mechanism for the movement of the tube. The sleeve 8, in particular the lower portion 8a thereof, containing the tube or stick 19, is moved by the lower part 17 next to the appliance base 19 containing the mechanism for the movement of the tube, not directly shown, so that the two parts mechanically couple with one another.

The mechanical coupling takes place by means of small projections or pins provided in the movement mechanism and penetrating the tube or stick 18 so as to fasten it.

Finally, the machine 10 can be provided with an extracting assembly to extract the tube or stick 18 from the sleeve 8.

In the embodiment of the machine shown in FIGS. 2-6, the extracting assembly is formed by the fixed support 28 cooperating with the movable lower part 17. The removal of the movable lower part 17 from the fixed support 28 causes the tube or stick 18 to detach from the sleeve 8.

Figure 6:
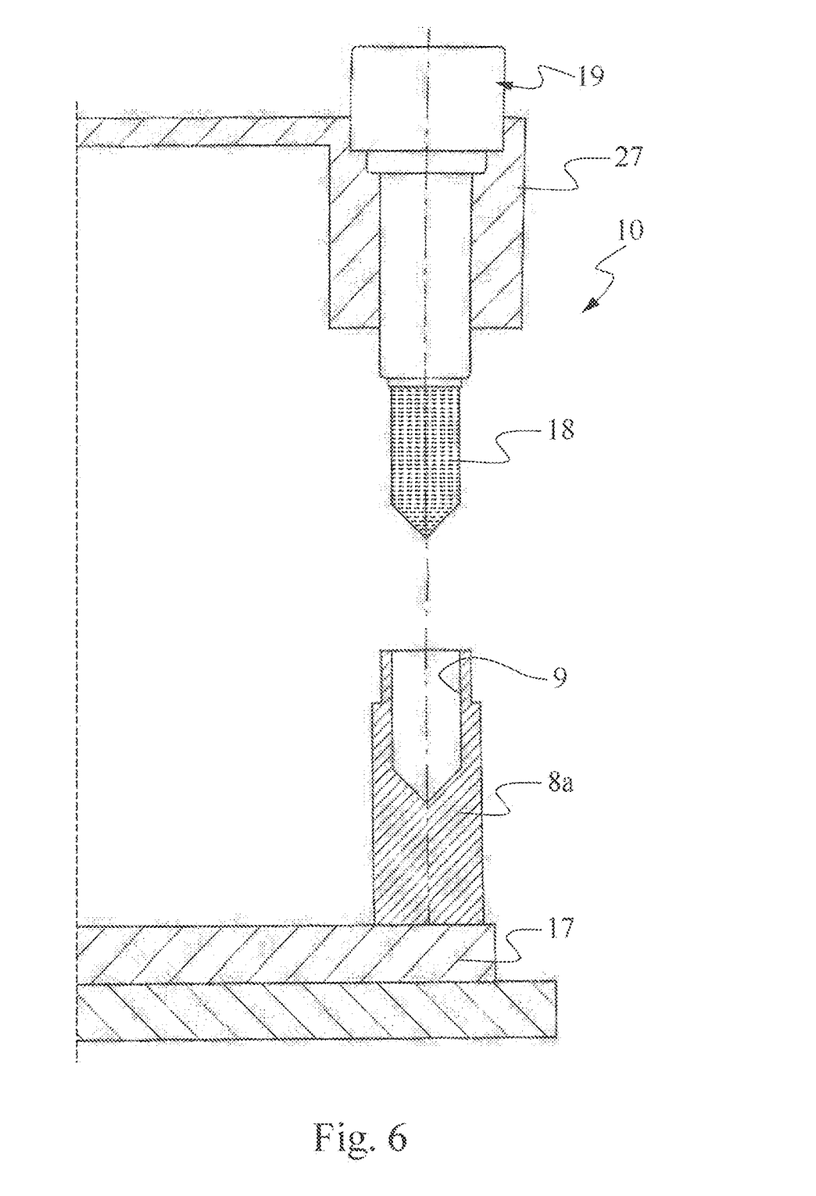
FIG. 6 is a schematic illustration of a fifth step of the machine according to the present invention in which the tube or stick combined with the appliance base is extracted from the sleeve.

The tube or stick remains constrained to the appliance base 19.

Optionally, the machine 10 can be provided with an extracting element to extract the capsule or pod from the pouring chamber or seat 6.

Hereinafter a method will be described for producing cosmetic products, preferably lipsticks, lip salves or lip glosses, by using the above described machine.

For ease of description, the method is illustrated by referring to a lipstick implementation, but it has to be understood that other cosmetic products, preferably shaped as tubes or sticks 18, can be implemented without departing from the protection scope of the present invention.

At the beginning a capsule or pod, preferably a capsule 7 containing an amount of preparation 1 of cosmetic product lower than 20 g, preferably lower than 10 g, is provided.

The capsule 7 is introduced into a pouring chamber or seat 6 to at least ⅔ of its height H. Preferably, the capsule or pod is introduced to at least 90% of its extent or height H. Advantageously, the capsule or pod is completely introduced into the pouring chamber or seat.

In the embodiment shown in FIGS. 2-6, the capsule 7 is introduced in a specific cavity 4 formed in a lower portion 13 of the frame of the machine 10.

At this point, the lower portion 13 of the frame of the machine 10 is closed together with an upper portion 15 to form the pouring chamber or seat 6.

Once the capsule 7 is introduced into the accommodating cavity or seat 4, the capsule 7 is heated up to a predetermined temperature adapted to cause an at least partial phase change of the preparation for cosmetic product contained therein.

Then the preparation for cosmetic product, which is preferably pasty or creamy, is allowed to pour inside a sleeve 8 provided with an inner cavity 9 reproducing the negative shape of the poured product to be obtained, i.e. a tube or stick shape.

To help the preparation 1 for cosmetic product contained in the capsule 7 to pour, a pressure can be applied thereto in order to aid its downward outflow.

The pressure is mechanically applied through a proper pressure member 11.

The pressure is applied successively or simultaneously with the heating step.

In the embodiment shown in FIGS. 2 and 3, when the pouring chamber or seat 6 is closed, a pressure member 11 applies a pressure by penetrating the capsule 7 so as to force the outflow of the preparation 1 for cosmetic product from the capsule 7.

For this purpose the capsule 7 can have a hole in the lower portion or bottom wall 7b thereof. Alternatively, a piercing step to pierce the container 2, i.e. the capsule 7, can be provided.

The piercing step follows the introduction of the capsule 7 into the accommodating cavity 4.

FIG. 3 shows the final step of pouring the preparation 1 for cosmetic product into the cavity 9 of the sleeve 8. The pressure member 11 fully penetrated the capsule 7 thereby causing the outflow of the preparation 1 for cosmetic product arranged in the cavity 9 of the underneath sleeve, thereby shaping the tube or stick 18.

At the end of the pouring, the sleeve 8 containing the shaped tube or stick 18 is moved to a cooling chamber 23 where the poured cosmetic product, i.e. the tube or stick 18, is cooled down to a temperature causing it to completely solidify.

Once the tube or stick 18 has been led to the proper temperature, preferably lower than 40° C., it is combined with an appliance base 19 containing a mechanism for the movement of the tube or stick 18.

FIG. 5 shows the step of combining the tube or stick 14 with the appliance base 19.

The combining is carried out by mechanical crimping, simply by leading the tube or stick 18 to contact the movement mechanism that is generally provided with projections or pins adapted to penetrate one end of the tube or stick 18 and to hold it.

Downstream of the step of combining the tube or stick 18 with the mechanism for the movement of the lipstick, there is a step of extracting the tube or stick 18 from the sleeve 8, shown for example in FIG. 6.

The tube or stick 18, coupled to the appliance base 19 comprising the mechanism for the movement of the tube, is spaced from the sleeve 8, preferably in a mechanical way, through the movements of portions of the machine 10.

At this point, the lipstick is finished and can be extracted from the machine 10 by simply grasping it manually from the appliance base 19.

After a quality control carried out by a user or end consumer, finally it can be covered by the specific tubular cover of the appliance and is ready to use.

Lastly, it is evident that variations, additions and modifications obvious for a person skilled of the art can be applied to the method and machine object of the present invention, without thereby departing from the protection scope provided by the enclosed claims.

The invention claimed is:

1. A method for producing cosmetic products, said method comprising:
   providing a containment capsule or pod containing an amount of preparation for cosmetic product lower than 20 g, said capsule or pod having a cup-shaped body comprising a side wall and a bottom, the capsule or pod extending along a central axis to a height H;
   introducing said pod or capsule into a pouring chamber or seat to at least ⅔ of H;
   heating said introduced pod or capsule in the pouring chamber or seat up to a predetermined temperature that causes a phase change of the preparation for cosmetic product in the pouring chamber or seat;
   causing only the heated preparation for cosmetic product from the heated pod or capsule to pour into an intermediate sleeve provided with an inner cavity reproducing the negative shape of the poured cosmetic product to be obtained, the heated pod or capsule being maintained in the pouring chamber or seat, the intermediate sleeve including a lower component and an upper component;
   cooling said cosmetic product poured in said intermediate sleeve;
   after the cooling, removing the upper component and combining a final appliance base containing a mechanism for movement of a tube or stick with the poured cosmetic product; and
   extracting, from the lower portion of the intermediate sleeve, the poured cosmetic product along with the final appliance base combined with the poured cosmetic product.

2. The method for producing cosmetic products according to claim 1, further comprising applying a pressure onto said preparation for cosmetic product contained in said capsule or pod to aid the pouring thereof.

3. The method for producing cosmetic products according to claim 2, wherein said pressure is mechanically applied through a pressure member.

4. The method for producing cosmetic products according to claim 1, wherein the cooling cools the cosmetic product down to a temperature lower than 40°.

5. The method for producing cosmetic products according to claim 1, wherein the heating the preparation for cosmetic product comprises heating said capsule or pod until the preparation for cosmetic product reaches a temperature higher than at least 60°.

6. The method for producing cosmetic products according to claim 1, wherein the inner cavity of said intermediate sleeve has the shape of a tube or a stick, and
   the poured cosmetic product has the shape of the tube or the stick.

7. The method for producing cosmetic products according to claim 1, wherein said pod or capsule comprises at least one thermally conductive portion.

8. The method according to claim 1, wherein the cosmetic products are one of lipsticks, lip salves, and lip glosses.

9. The method for producing cosmetic products according to claim 1, wherein the capsule is at least partially made of a conductive material.

10. A method for producing cosmetic products, said method comprising:
    providing a containment capsule or pod containing an amount of preparation for cosmetic product lower than 20 g, said capsule or pod having a cup-shaped body comprising a side wall and a bottom and extending along a central axis to a height H, said capsule or pod being hermetically sealed;
    introducing said pod or capsule into a pouring chamber or seat to at least ⅔ of H;
    piercing or perforating said introduced capsule or pod;
    heating said pierced pod or capsule in the pouring chamber or seat up to a predetermined temperature that causes a phase change of the preparation for cosmetic product in the pouring chamber or seat;
    causing only the preparation for cosmetic product from the heated pod or capsule to pour into an intermediate sleeve provided with an inner cavity reproducing the negative shape of the poured cosmetic product to be obtained, the heated pod or capsule being maintained in the pouring chamber or seat, the intermediate sleeve including a lower component and an upper component;
    cooling said cosmetic product poured in said intermediate sleeve;
    after the cooling, removing the upper component and combining a final appliance base containing a mechanism for movement of a tube or stick with the poured cosmetic product; and
    extracting, from the lower portion of the intermediate sleeve, the poured cosmetic product along with the final appliance base combined with the poured cosmetic product.

* * * * *